March 6, 1962
W. H. JACOB
3,023,530
SAFETY HOLDING AND RELEASE DEVICE FOR FISH LANDING NETS
Filed Sept. 2, 1960
2 Sheets-Sheet 1
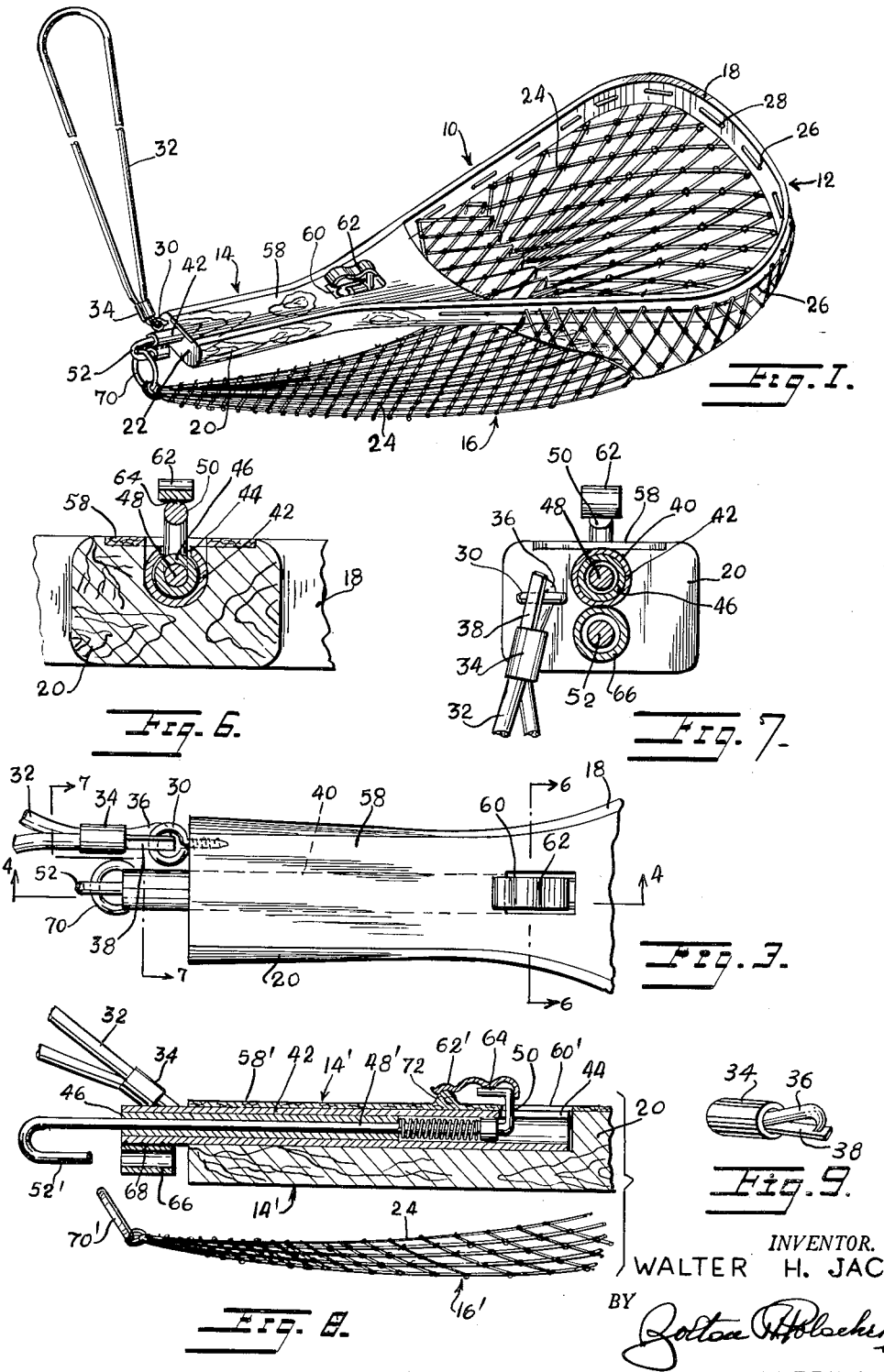
INVENTOR.
WALTER H. JACOB
BY
Zoltan Holschik
ATTORNEY

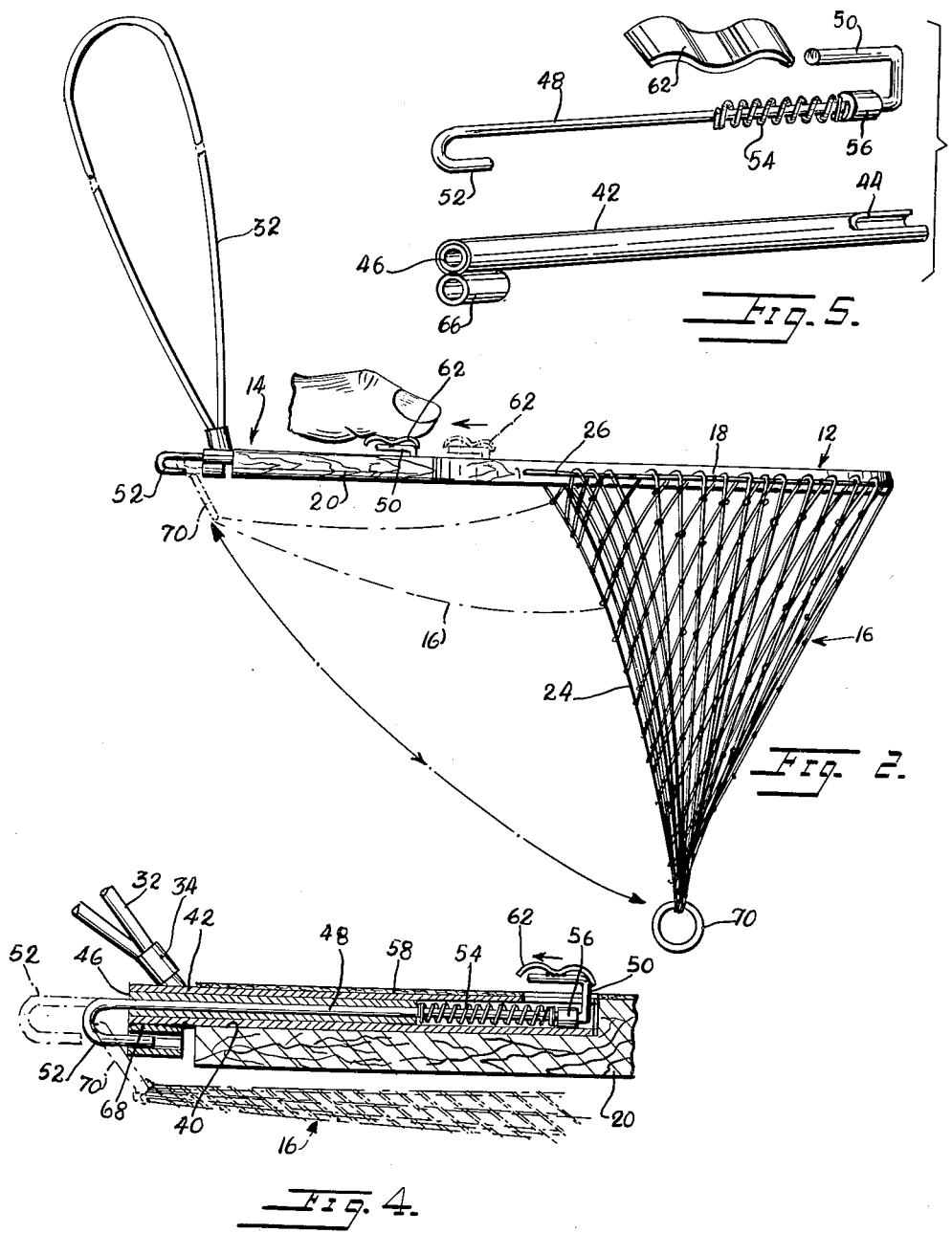

United States Patent Office 3,023,530
Patented Mar. 6, 1962

3,023,530
SAFETY HOLDING AND RELEASE DEVICE
FOR FISH LANDING NETS
Walter H. Jacob, 1093 Lynwood Ave., New Milford, N.J.
Filed Sept. 2, 1960, Ser. No. 53,775
2 Claims. (Cl. 43—12)

This invention relates to new and useful improvements in a fisherman's net for landing fish.

Hand nets used by fishermen to land fish which have been hooked have the disadvantage that the net which hangs down is liable to become entangled with the fish line particularly where multi-hook plugs are being used, and is also liable to become entangled with paraphernalia on the boat and other fishing gear. Furthermore, such nets often interfere and hamper movement of the fisherman and are not easily carried, often become misplaced and thus not available for use when needed.

A primary object of the invention is to provide a landing net wherein the net material proper can be quickly and conveniently arranged in an inactive position where it will not become entangled in the fishing line, fishing gear, brush or the like and wherein the net can be collapsed and folded for storing, packaging or for transportation.

Still another object is to provide a landing net which may be readily manipulated by one hand to land the fish thus leaving the other hand of the fisherman free to handle the line.

Yet another object is to provide a landing net which is of simple construction, is readily opened for use or collapsed for storage, packaging or transportation, and which is effective in preventing the loss of struggling fish being landed by the net.

A further object is to provide a landing net that can readily be supported on the person of the fisherman while wading or walking whereby it will not interfere with or hamper his movements and at the same time be ready for instant extension to an active position for netting and landing a fish.

A specific object of the invention is to provide the handle of the landing net with means for holding the net material in an inoperative position and with means for releasing said holding means, both means being a one-hand operation.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a top perspective view of a fisherman's landing net embodying the invention, showing the body of the net proper supported in inactive position.

FIG. 2 is a side elevational view showing the landing net in active position, parts being broken away.

FIG. 3 is a fragmentary top plan view of one end of the handle.

FIG. 4 is a sectional view taken on the line 4—4 of FIG. 3.

FIG. 5 is a spread perspective view of the net proper holding and releasing means.

FIG. 6 is a cross-sectional view taken on the line 6—6 of FIG. 3.

FIG. 7 is a cross-sectional view taken on the line 7—7 of FIG. 3.

FIG. 8 is a view similar to FIG. 4 showing a modification of the invention.

FIG. 9 is a perspective view of the fastening clip on the cord.

Referring in detail to the drawings, in FIG. 1 a fisherman's landing net embodying the invention is shown and designated generally by the reference numeral 10. The landing net 10 comprises a frame 12 having a handle portion 14 and a net proper 16 with a conical-shaped body supported at its wide end by the frame.

The frame is formed of suitable material having a degree of resiliency and preferably possesses buoyancy as, for example, wood, plastic or any other suitable buoyant material. For purpose of illustration, the frame is shown formed of wood and includes a bowed portion 18 and the handle portion 14. The handle portion includes a shank 20 which is preferably rectangular in cross-sectional configuration and terminates in a free end having a flat surface 22.

The body of the net proper 16 is composed of crossed spaced cords 24. A thread 26 is threaded through spaced openings 28 in the bowed portion 18 of the frame 12 and secures the upper open end of the body of the net proper to the outside of the bowed portion of the frame.

In accordance with the invention, a shanked eyelet 30 is threaded into the flat surface 22 of the handle portion and serves as a device for fastening a flexible looped cord or strap 32, round in cross section, to the handle portion. The cord or strap 32 is sufficiently long to slip over the arm of the fisherman and onto his shoulder for supporting the landing net from the shoulder. The cord or strap has a clip 34 at one end provided with a hooked finger 36 and a coacting spring pressed finger 38 for fastening the cord or strap onto the eyelet.

Another important feature of the invention is mechanism for holding the body of the net proper in a collapsed inactive position as shown in FIG. 1. For this purpose, the flat top surface of the shank 20 of the handle portion is formed with a channel 40 extending centrally of the shank and intersecting the outer flat surface 22 thereof. A metal tubular member 42 is fitted in the channel and projects outwardly of the free end of the handle portion. The wall of the tubular member at its inner end is slotted as indicated at 44, the slot opening upwardly and intersecting said end as seen in FIG. 6. Another metal tubular member 46 of smaller diameter is nested in the tubular member 42 extending inwardly thereof to a point remote from the slot 44. The outer end of the inner tubular member 46 is flush with the outer tubular member 42. A round rod 48 slidably fits in the bore of the inner tubular member 46 and is of a length to extend outwardly of both ends of said tubular member 46. At its inner end, the rod is shaped in the form of a hook 50 extending upwardly through the slot 44 and is adapted to hook over the inner end of the wall of the slot 44. The outer end of the rod is also shaped in the form of a hook 52 extending in a direction opposite to the direction of extension of the inner hook 50 as will be clearly seen from FIG. 4. A retractable coil spring 54 is sleeved around the rod 48 at its inner end with one end of the coil impinging against the end of the inner tubular member 46 and its other end seated against a collar 56 secured to the rod adjacent its inner end. The channel 40 in the shank of the handle is closed by a closure plate 58 having a rectangular-shaped opening 60 to provide a clearance for the hook 50 of the rod 48.

A curved metal plate 62 rectangular in plan is secured to the protruding portion of the hook 50 by means of soldering 64 or the like and serves as a finger piece for actuating the rod 48. A short tubular member 66 open at both ends is secured to the outer protruding end of the outer tubular member 42 by soldering 68 or the like and is disposed in the path of movement of the hook 52 to serve as a keeper socket for said hook.

In use, the rod 48 is normally positioned so that its hook 52 is in the keeper socket 66 with its hook 50 at the innermost end of the slot 40. When it is desired to support the net body 16 in an out-of-the-way position, the rod 48 is slid outwardly by the finger of the fisherman on the finger piece 62 as shown in FIG. 2, against the action of spring 54, carrying the hook 52 outwardly away from the keeper socket 66. The net body 16 is then swung against the frame and handle and a ring 70 fastended to the narrow free end of the net body is slipped over the free end of the moved hook 52. The rod is then retracted to its original position moving the hook 52 into the keeper socket 66 thereby holding the ring against displacement and the body of the net proper against the frame and handle out of the way. The coil spring 54 holds the hook 52 in closed position in the keeper socket. The landing net is now in collapsed compact form and the looped strap 32 is slipped over the arm and shoulder of the fisherman in order to suspend the landing net alongside the body of the fisherman.

In FIG. 8, a handle portion 14' with a modified closure plate 58' is shown. The closure plate is formed with a short ridge 72 on its upper surface disposed transversely of the plate adjacent to the slot 60' therein and disposed in the path of movement of the end of the finger piece 62' so that the end of the finger piece is adapted to contact the ridge and hold the rod 48' against accidental displacement when moved to outermost position as shown. This permits the fisherman to use both hands for slipping the ring 70' on the net body 16' on to the hook 52'.

In all other respects the handle portion 14' is similar to the handle portion 14 and similar reference numerals are used to indicate similar parts.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A fisherman's landing net comprising a frame having a bowed portion and a handle portion, the handle portion having an inner end and an outer free end, a net body of corded material suspended from the bowed portion, said body being of conical shape with the wide end fastened to the bowed portion, means adapted to be actuated by the hand of the fisherman holding the handle portion for releasably holding the net body in flatwise condition against the frame, said means including a tube in the handle portion, a rod slidably mounted in the tube and having a hooked end extending outwardly of the free end of the handle portion and having a hooked end inwardly of the free end, the inner end of the handle portion and the tube having elongated communicating slots therein, the inner hooked end of the rod extending through said slots so as to be accessible to the fisherman, a finger piece on the inner hooked end for actuating the rod, a keeper socket on the tube disposed outwardly of the free end of the handle portion adapted to receive the outer hooked end when the rod is moved inwardly, spring means normally urging the rod inwardly of the handle portion and maintaining the outer hooked end thereof in said socket, and means on the narrow end of the net body adapted to coact with the outer hooked end for holding the net body in flatwise condition against the frame.

2. A fisherman's landing net comprising a frame having a bowed portion and a handle portion, the handle portion having an inner end and an outer free end, a net body of corded material suspended from the bowed portion, said body being of conical shape with the wide end fastened to the bowed portion, means adapted to be actuated by the hand of the fisherman holding the handle portion for releasably holding the net body in flatwise condition against the frame, said means including a tube in the handle portion, a rod slidably mounted in the handle portion and having a hooked end extending outwardly of the free end of the handle portion and having a hooked end inwardly of the free end, the inner end of the handle portion and the tube having elongated communicating slots therein, the inner hooked end of the rod extending through said slots so as to be accessible to the fisherman, a finger piece on the inner hooked end for actuating the rod, a keeper socket on the tube disposed outwardly of the free end of the handle portion adapted to receive the outer hooked end when the rod is moved inwardly, spring means normally urging the rod inwardly of the handle portion and maintaining the outer hooked end thereof in said socket, and a ring on the narrow end of the net body adapted to coact with the outer hooked end for holding the net body in flatwise condition against the frame.

References Cited in the file of this patent

UNITED STATES PATENTS

| | | |
|---|---|---|
| 174,263 | Kunz | Feb. 29, 1876 |
| 1,309,605 | Badger | July 15, 1919 |
| 1,367,822 | Linosay | Feb. 8, 1921 |
| 1,879,991 | Pratt | Sept. 27, 1932 |
| 2,504,356 | Stalker | Apr. 18, 1950 |
| 2,593,563 | Baloun | Jan. 30, 1951 |
| 2,688,815 | Phillips | Sept. 14, 1954 |
| 2,907,134 | Trautvetter | Oct. 6, 1959 |